NOVEL ANTIOXIDANTS AND ANTIOZONANTS

Ivan C. Popoff, Ambler, and Harry E. Albert, Lafayette Hill, Pa., assignors to Pennsalt Chemicals Corporation, Philadelphia, Pa., a corporation of Pennsylvania
No Drawing. Filed Sept. 21, 1960, Ser. No. 57,375
19 Claims. (Cl. 260—45.9)

This invention relates to novel compounds which have both antioxidant and antiozonant properties. In particular, this invention deals with compounds having an ether or thioether structure and which are derived from N,N'-substituted p-phenylenediamines. These novel compounds are of value in elastomeric compositions where they prevent adverse effects due to oxygen and ozone.

It is well known that natural and synthetic elastomers are subject to degradation due to both ozone and oxygen. Numerous compounds have been evaluated as antioxidants and antiozonants for elastomers and it has been found that good antioxidant and antiozonant properties are found in the class of p-phenylenediamines of structure

where the R groups represent alkyl, cycloalkyl or aryl radicals. Fore example, N,N' - di - 2-octyl-p-phenylenediamine, N - phenyl - N'-cyclohexyl - p - phenylenediamine, N,N' - di - [3 - (5-methylheptyl)] - p - phenylenediamine and N,N'-di-sec-butyl-p-phenylenediamine are reported to have antioxidant and antiozonant properties when incorporated into elastomers. Unfortunately, however, this class of p-phenylenediamine derivatives presents a serious problem in actual use. Because these compounds discolor light stocks very badly, they can be used only in black rubber goods and even here, goods containing these agents often stain light colored articles with which they come in contact.

It has now been found that improved elastomers protected against the adverse effects of oxygen and ozone can be obtained by incorporating the novel compounds of this invention. These novel compounds have the general structure:

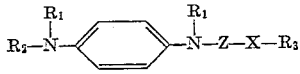

where $R_1$ is a member of the group of alkyl, alkenyl and cycloalkyl radicals containing from one to twelve carbon atoms, $R_2$ is a member of the group of hydrogen, $R_1$ and —Z—X—$R_3$ radicals, $R_3$ is selected from the group of $R_1$ and

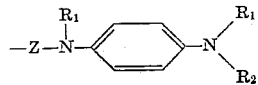

radicals, Z is an alkylene group containing one to four carbon atoms and X is an atom selected from the group of oxygen and sulfur.

These novel compounds are prepared quite readily in several ways depending upon the particular agent desired. One of the starting reactants may be a N,N'-disubstituted-p-phenylenediamine, i.e. a compound of structure

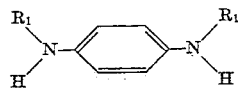

where $R_1$ is defined above. (Such compounds are disclosed in U.S. 2,867,604.) If the desired compound is to have the structure

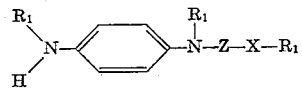

then one mole of the N,N'-disubstituted-p-phenylenediamine is reacted with about one mole of a haloalkyl ether (or sulfide) where the halogen on the alkyl radical is chlorine, bromine, or iodine. The reaction proceeds as follows:

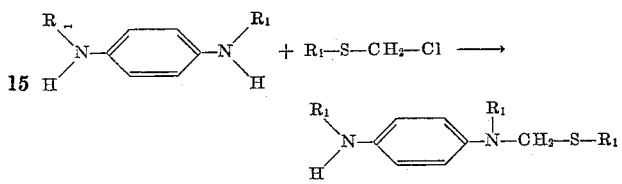

Use of about two moles of the ether (or sulfide) per mole of p-phenylenediamine derivative would, of course, yield the disubstituted bis-compound of formula:

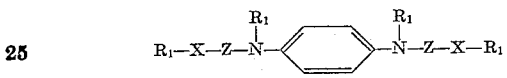

It is apparent that in this structure $R_2$ in the generic formula is a $R_3$—X—Z—radical where $R_3$ is $R_1$. Compounds of this invention having these structures are exemplified by N,N'-diethyl-N-(methoxymethyl)-p-phenylenediamine,
N,N'-di-sec-butyl-N,N'-bis(methoxyethyl)-p-phenylenediamine,
N,N'-di-[3-(5-methyl)heptyl]-N-(n-octyloxyethyl)-p-phenylenediamine,
N,N'-di-dodecyl-N,N'-bis(n-butylmercaptoethyl)-p-phenylenediamine,
N,N'-di-cyclohexyl-N,N'-bis-(cyclohexylmercaptoethyl)-p-phenylenediamine,
N,N'-di-sec-butyl-N,N'-bis(decylmercapto-n-butyl)-p-phenylenediamine,
N,N'-di-hexenyl-N-(n-hexyloxyethyl)-p-phenylenediamine, and the like.

When a N,N,N'-tri-substituted p-phenylene is the starting material reacted with the alkyl haloalkyl ether (or sulfide), the product will have the structure:

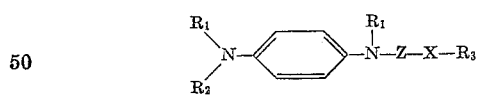

where $R_2$ and $R_3$ are both $R_1$ radicals as defined above. In this case one mole of the p-phenylenediamine derivative will be used per mole of the haloether and the compounds thus obtained are exemplified by N,N,N'-tri-sec-butyl-N'-(n-decyl-mercapto-n-butyl)-p-phenylenediamine,
N,N'-di-dodecyl-N-sec-butyl-N'(vinylmercaptoethyl)-p-phenylenediamine,
N,N,N'-tri-[3-(5-methylheptyl)]-N-(vinyloxyethyl)-p-phenylenediamine, etc.

The trisubstituted p-phenylenediamine compound is readily prepared by reductive alkylation of an N,N'-disubstituted p-phenylenediamine with an aldehyde or ketone by the process disclosed in U.S. 2,883,362 and U.S. 2,902,466.

The process of preparing the above compounds is carried out quite easily by adding a solution of the haloalkyl ether or sulfide in an inert solvent (e.g. hydrocarbon or ethereal solvent) to a stirred solution of the p-phenylenediamine derivative. The reaction is usually completed at somewhat elevated temperatures, say about 50° to 200° C. depending upon the reactants and the solvent used. An HCl acceptor such as an organic or inorganic base (e.g. triethylamine, pyridine, $Na_2CO_3$, $NaHCO_3$, etc.) is usually present to assist completion of the reaction. When the addition is completed, the reaction mass is cooled, any insoluble inorganic matter is filtered off or washed off with water and the solvents and any excess reactants separated from the reaction product. The crude product residue is usually a brown material which may be used without further purification. It may be purified by crystallization from aqueous methyl or ethyl alcohol or by distillation at reduced pressures.

The haloalkyl ethers or sulfides used are well known compounds having the structure $R_1$—X—Z—Y where Y is chlorine, bromine, or iodine, and where $R_1$, X, and Z are defined above. Examples of such ethers and sulfides are chloromethyl methyl ether, chloromethyl ethyl ether, bromomethyl methyl sulfide, 2-iodoethyl ethyl ether, chloromethyl n-propyl ether, bromomethyl n-butyl sulfide, 2-iodoethyl cyclohexyl ether, methyl chloromethyl sulfide, methyl bromomethyl sulfide, methyl 1-chloroethyl sulfide, 2-chloroethyl methyl sulfide, ethyl bromomethyl sulfide, n-propyl chloromethyl ether, n-propyl chloromethyl sulfide, benzyl chloromethyl sulfide, bromoethyl n-amyl ether, 1-bromomethoxy-1-methyl-heptane, 4-chlorobutyl alkyl ether, 2-iodoethyl vinyl ether, and the like. Many of these compounds and other representative halo ethers and thioethers are described and their preparation given by Wagner and Zook in their book "Synthetic Organic Chemistry," J. Wiley & Sons, 1953 (see Tables 20 and 111).

Still another variation and embodiment of this invention is the use in elastomers of novel antioxidants and antiozonant compounds obtained by reacting a difunctional halo ether (or sulfide) with the N,N'-substituted p-phenylenediamine derivative. Some specific halo ethers useful in this embodiment are bis(2-chloroethyl)sulfide, bis(4-bromo-n-butyl) ether, chloromethyl-2-chloroisopropyl ether, 1-chloroethyl-2-chloroethyl ether, 2-bromoethyl- 1- chloroethyl ether, bis(2-bromoethyl) ether, bis(2-iodoethyl) ether, 2-chloroethyl-1-chloro-n-butyl ether, and the like. Additional examples of such difunctional ethers will be found in the Wagner and Zook reference above. It will be understood that numerous variations are possible within this embodiment of using a dihalo ether. For example, a N,N,N'-trisubstituted p-phenylenediamine may be reacted with the difunctional ether to yield compounds of structure:

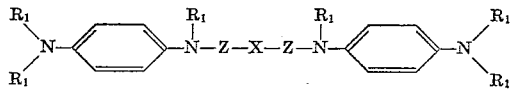

In this embodiment, $R_3$ of the generic formula becomes

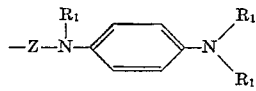

Specific compounds illustrating this class are those having the above structure where the $R_1$ radical is sec-butyl, 3-(5-methyl) heptyl, n-octyl, cyclohexyl, methylcyclohexyl, etc. It will, of course, be understood that the $R_1$ radicals on the p-phenylenediamine derivative used need not be the same. Z, the alkylene group of the above compounds, may be methylene, ethylene, propylene and butylene, and X, of course, is an oxygen or sulfur atom.

Another variation contemplated and embodied in this invention is represented by the reaction products of a difunctional haloether (or sulfide) with N,N'-disubstituted p-phenylenediamines. In this embodiment both reactants are difunctional and when a 1:1 molar ratio of reactants is used, polymeric compounds will be formed. To illustrate further, such compounds will have a polymeric structure having the repeating units:

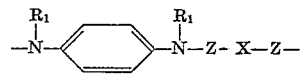

and in this case $R_2$ of the generic structure is $R_3$—X—Z— where $R_3$ is

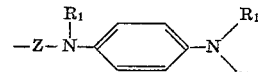

When the process is carried out under conditions of very high dilution (i.e. low concentration of reactants) ring compounds rather than polymers may be obtained. Mole ratios other than 1:1 can be used, of course, as for example, 3 moles of the N,N'-disubstituted-p-phenylenediamine derivative per 2 moles of difunctional halo ether to give a product of structure:

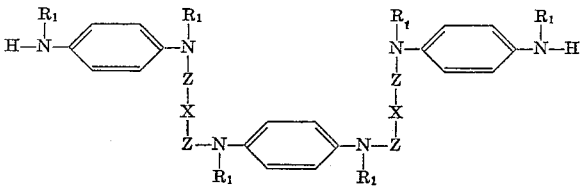

As stated above, the $R_1$ radicals in the above structural formulas may be the same or different.

The process employing the difunctional ethers or sulfides to yield these products is also readily carried out. As before, a solution of the ether reactant in an inert solvent is added to a stirred solution of the p-phenylenediamine derivative containing an acid acceptor. As the addition is made, the reaction mass is held at temperatures of about 0° to 30° C. and after the addition is complete, the mass is heated to about 50° to 80 °C. for one to three hours to ensure completion. The reaction mass is filtered and the filtrate distilled to obtain the crude product residue.

As indicated, the haloether or sulfide used will contain up to four carbon atoms in its haloalkyl portion (i.e. —Z—Cl). This is an important feature of this invention, for if there are more than four carbon atoms in —Z—, the reaction between the p-phenylenediamine and the haloether is impractically slow and of little synthetic value. Furthermore, the use of a haloether or sulfide is also significant to this invention, for in the absence of the oxygen or sulfur atom, the reaction with the p-phenylenediamine compound is much more difficult to achieve.

The compounds of this invention as prepared by the above techniques are, in general, viscous oils, crystalline solids or resin-like materials. These novel compounds are easily compounded into elastomer stocks and need no special processing. The elastomer materials with which they may be used include both synthetic and natural rubber. The synthetic rubbers may be any of the butadiene polymer rubbers such as styrene-butadiene rubber, polyisoprene, butadiene-acrylonitrile elastomers, cis-polybutadiene, cis-polyisoprene and the like. Other synthetic rubbers such as the polysulfide rubbers (Thiokol), silicone rubbers, polychloroprene, polyisobutylene rubber, fluoroelastomers and the like are subject to ozone attack to a lesser extent than butadiene polymer rubbers, and the novel compounds of this invention may also be used to protect these rubbers against such ozone attack. The amount of novel compound incorporated in the rubber will vary between about 0.5% and 10% based on the rubber weight depending upon efficacy and economics of the agent used. In general, however, from about 0.75% to 3.0% will be used.

As indicated, these novel compounds show both antioxidant and antiozonant effects when incorporated into elastomers. These compounds may also be used as polymer stabilizers, which is a special antioxidant application. In this application the antioxidant protects the crude elastomer prior to processing and is used in either latices or in the solid elastomer. Elastomers containing the novel compounds of this invention are not severely discolored on aging and these compounds are also characterized by having low volatility and low scorching tendencies and thus provide means for imparting to elastomers a combination of very desirable properties.

The preferred compounds of this invention are those derived from N,N'-di- and trisubstituted p-phenylenediamines where the $R_1$ substituent is an alkyl group containing 3 to 9 carbon atoms. Compounds in this preferred class represent the optimum from the standpoint of volatility, compatibility with the elastomer, performance and ease of preparation. It is also preferred that chlorine or bromine be the halogens present in the mono- and dihalo ethers or thioethers used in the preparation of the above compounds. The corresponding iodo compounds are satisfactory, but for reasons of economy it is preferred to use chloro or bromo derivatives. Some of the preferred compounds of this invention are:

N,N'-bis[3-(5-methyl)heptyl]-N-methylmercaptomethyl-p-phenylenediamine;
N,N'-bis[3-(5-methyl)heptyl]-N-(2-n-octylmercapto) ethyl-p-phenylenediamine;
N,N'-bis[3-(5-methyl)heptyl]-N-(2-ethylmercapto) ethyl-p-phenylenediamine;
N,N'-di-sec-butyl-N-methylmercaptomethyl-p-phenylenediamine;
N,N'-di-sec-butyl-N-(2-ethylmercapto) ethyl-p-phenylenediamine;
N,N'-di-sec-butyl-N-(2-methylmercapto) ethyl-p-phenylenediamine;
N,N'-di-sec-butyl-N-methoxymethyl-p-phenylenediamine;
N,N'-bis[3-(5-methyl)heptyl]-N-(2-ethyloxy) ethyl-p-phenylenediamine;
N,N'-diisopropyl-N-(2-n-octyloxy) ethyl-p-phenylenediamine;
N,N'-bis[3-(5-methyl)heptyl]-N,N'-bis(methylmercaptomethyl)-p-phenylenediamine;
N,N'-bis[3-(5-methyl)heptyl]-N,N'-bis[(2-n-octylmercapto)ethyl]-p-phenylenediamine;
N,N'-bis[3-(5-methyl)heptyl]-N,N'-bis[(2-ethylmercapto)ethyl]-p-phenylenediamine;
N,N'-di-sec-butyl-N,N'-bis(methylmercaptomethyl)-p-phenylenediamine;
N,N'-di-sec-butyl-N,N'-bis[(2-ethylmercapto)ethyl]-p-phenylenediamine;
N,N'-di-sec-butyl-N,N'-bis(methoxymethyl)-p-phenylenediamine;
N,N'-bis[3-(5-methyl)heptyl]-N,N'-bis[(2-ethoxy)ethyl]-p-phenylenediamine;
N,N'-dicyclohexyl-N,N'-bis[2-n-octyloxy)ethyl]-p-phenylenediamine;
N,N'-bis[(2-ethoxy)ethyl]-N-isopropyl-N'-cyclohexyl-p-phenylenediamine;
N,N'-diisopropyl-N-(2-ethoxy)ethyl-N'-(2-ethylmercapto)ethyl-p-phenylenediamine;
N,N'-di-sec-butyl-N,N'-bis[p-(sec-butylamino)phenyl]-di(aminomethyl) sulfide;
N,N'-di-sec-butyl-N,N'-di[p-(sec-butylamino)phenyl]-bis(2-aminoethyl) ether;
N,N'-dicyclohexyl-N,N'-bis[p-(sec-butylamino)phenyl]-di(aminomethyl) sulfide;
N,N'-diisopropyl-N,N'-di[p-(sec-butylamino)phenyl]-bis(2-aminoethyl) sulfide;
Polymeric product from reaction of 1 mole of N,N'-di-sec-butyl-p-phenylenediamine with 1 mole of bis (β-chloroethyl) ether;
N,N'-diisopropyl-N-(tert-nonylmercaptomethyl)-p-phenylenediamine.

The following examples are given to more fully describe the invention:

EXAMPLES

A. PREPARATION OF COMPOUNDS

I. Compounds of type:

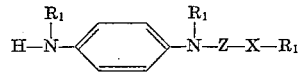

*Example 1.—N,N'-Bis[3-(5-Methyl)Heptyl]-N-Methylmercaptomethyl-p-Phenylenediamine*

To a stirred solution of 66.4 g. (0.2 mole) of N,N'-bis[3-(5-methyl)heptyl]-p-phenylenediamine in 100 cc. n-hexane and 30.3 g. (0.3 mole) triethylamine was added slowly a solution of 21.0 g. (0.2 mole) of chlorodimethyl sulfide in 100 cc. n-hexane over 3 hr. period at 5–10° C. The reaction mixture was stirred for an additional 3 hrs. at about 70° C., cooled to room temperature and filtered to remove the triethylamine hydrochloride formed as by-product in 95% yield. The filtrate was evaporated to remove the solvent. The pot residue was the crude N,N'-bis[3 - (5 - methyl) heptyl]-N-methylmercaptomethyl-p-phenylenediamine, a brown oil obtained in 94% yield.

*Example 2.—N,N'-Bis[3-(5-Methyl) Heptyl]-N-2-(n-Octylmercapto)Ethyl-p-Phenylenediamine*

A solution of 21.0 g. (0.1 mole) of 2-n-octylmercapto-ethyl chloride in 20 cc. toluene was added over a 3 hr. period to a refluxing stirred solution of 33.2 g. (0.1 mole) N,N'-bis[3-(5-methyl) heptyl]-p-phenylenediamine in 30.0 g. (0.3 mole) triethylamine and 100 cc. toluene. The refluxing and stirring at 111° C. was continued for additional 20 hours. After cooling to 10° C. only a trace of solid material precipitated. Seventeen grams (0.17 mole) of triethylamine and 50 cc. toluene were added to the reaction mixture and stirred in a 0.5 gal. autoclave for 7 hrs. at 190° C. at 85 p.s.i.g. autogenous pressure. The reaction mixture was filtered at room temperature to isolate 145 g. (105%) triethylamine hydrochloride. The filtrate was evaporated at 120° C. pot temperature at 700–10 mm. Hg pressure. The distillation residue was the crude product of 51.0 g. (100%), red oil having a sulfide-like odor. The compound has the structure:

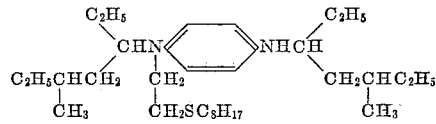

*Example 3.—N,N'-Bis[3-(5-Methyl) Heptyl]-N-(2-n-Octylmercapto)Ethyl-p-Phenylenediamine*

A mixture of 132.8 g. (0.4 mole) of N,N'-bis[3-(5-methyl) heptyl]-p-phenylenediamine, 100 cc. toluene, 80.0 g. (0.8 mole) triethylamine and 50.0 g. (0.4 mole) ethyl 2-chloroethyl sulfide was heated 7 hrs. at 190° C. in a ½ gal. stirred autoclave. The autogenous pressure was 120–140 p.s.i.g. The cooled reaction mixture was filtered to remove the triethylamine hydrochloride (ca. 85% of theory) and the filtrate was distilled to remove the solvent. The distillation residue was the crude product (87–90% of theory), of N,N'-bis[3-(5-methyl) heptyl]-N-(2-ethylmercapto) ethyl-p-phenylenediamine, a red oil and having the structure:

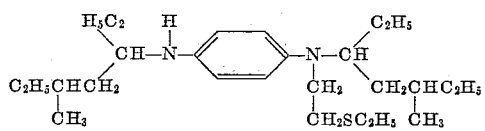

*Example 4–A.—N,N'-Di-Sec-Butyl-N-Methylmercaptomethyl-p-Phenylenediamine*

The product was obtained in 90–95% yield by reacting one mole of N,N'-di-sec-butyl-p-phenylenediamine with one mole of chlorodimethyl sulfide in n-hexane. Sufficient amount of triethylamine was used as the HCl acceptor. The crude product is a brown liquid.

*Example 4–B.—N,N'-Dicyclohexyl-N-Methyl-mercaptomethyl-p-Phenylenediamine*

This product was obtained by reacting 1 mole of N,N'-dicyclohexyl-p-phenylenediamine with 1 mole of chlorodimethyl sulfide in n-hexane. One mole of triethylamine was used as the HCl acceptor. The crude product is a brown liquid.

*Example 5–A.—N,N'-Di-Sec-Butyl-N-(2-Ethyl-mercapto) Ethyl-p-Phenylenediamine*

A mixture of 44.0 g. (0.2 mole) of N,N'-di-sec-butyl-p-phenylenediamine, 40.0 g. (0.4 mole) triethylamine, 25.0 g. (0.2 mole) β-chlorodiethyl sulfide and 50 cc. toluene was heated for 7 hrs. at 180–190° C. in a 300 cc. shaker-type autoclave. The autogenous pressure was 120–130 p.s.i.g. The reaction mixture was cooled to room temperature and filtered to remove the triethylamine hydrochloride formed as by-product in 87% yield. The filtrate was evaporated to remove the solvent and the excess of triethylamine. The distillation residue was the crude N,N'-di-sec-butyl - N - (2-ethylmercapto) ethyl-p-phenylenediamine, a brown oil obtained in 87% yield.

*Example 5–B.—N,N'-Dialkyl-N-Methylmer-captomethyl-p-Phenylenediamine*

This product was obtained in accord with the details of Example 5–A by reacting 1 mole of N,N'-dialkyl-p-phenylenediamine with 1 mole of chlorodimethyl sulfide in n-hexane. One mole of triethylamine was used as the HCl acceptor. The crude product is a brown liquid.

*Example 6*

A solution of 44.0 g. (0.2 mole) of N,N'-bis-secondary butyl-p-phenylenediamine, 40.0 g. (0.4 mole) triethylamine, 22.0 g. (0.2 mole) methyl chloroethyl sulfide and 50 cc. toluene was shaken 66 hrs. in a 300 cc. shaker-type autoclave at 180–190° C. The autogenous pressure was about 200 p.s.i.g. The reaction mixture was filtered at room temperature to remove the triethylamine hydrochloride (ca. 65%) and the filtrate was distilled to remove the solvent. The distillation residue was the crude product obtained in 80% yield. The N,N'-di-sec-butyl-N-(2-methylmercapto)-ethyl-p-phenylenediamine product is a red oil of structure:

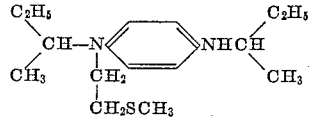

II. Compounds of type:

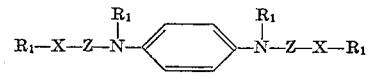

*Example 7.–N,N'-Bis[3-(5-Methyl) Heptyl]-N,N'-Bis-(Methylmercaptomethyl)-p-Phenylenediamine*

This material was obtained in 89% yield by the method of Example 1, but using 2 moles of chlorodimethyl sulfide per one mole of N,N'-bis[3-(5-methyl) heptyl]-p-phenylenediamine. The product is a brown liquid.

*Example 8*

Following the essential details of Example 2, N,N'-bis-[3-(5-methyl) heptyl]-N,N'-bis[2 - n - octylmercapto) ethyl]-p-phenylenediamine was prepared by using two moles of 2-n-octylmercaptoethyl chloride per mole of the phenylenediamine derivative. The crude product is a brown mushy solid having the structure:

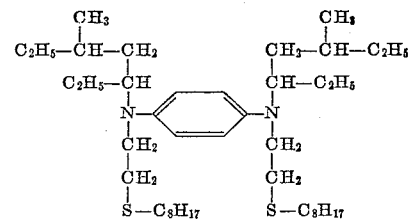

*Example 9*

Example 3 was repeated except that the amounts of triethylamine and ethyl 2-chloroethyl sulfide were doubled. The product N,N'-bis[3-(5-methyl) heptyl]-N,N'-bis[(2 - ethylmercapto) ethyl]-p-phenylenediamine is a red oil of structure:

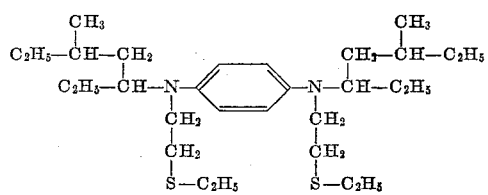

*Example 10.—N,N'-Di-Sec-Butyl-N,N'-Bis-(Methyl-mercaptomethyl)-p-Phenylenediamine*

Example 4 was repeated using two moles of chlorodimethyl sulfide per mole of N,N'-di-sec-butyl-p-phenylenediamine. The crude product is a brown liquid of structure:

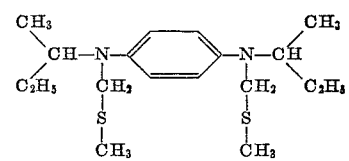

*Example 11*

Example 5 was repeated except that double amounts of triethylamine and β-chlorodiethyl sulfide were used. The product N,N'-di-sec-butyl-N,N'-bis[(2 - ethylmercapto)-ethyl]-p-phenylenediamine is a brown oil of structure:

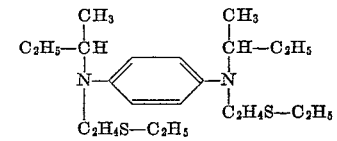

III. Compounds of type:

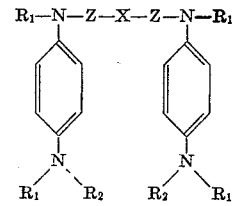

*Example 12.—N,N'-Di-Sec-Butyl-N,N'-Bis[p-(Sec-Butylamino) Phenyl]Di(Aminomethyl) Sulfide*

A mixture of 88.0 g. (0.4 mole) N,N'-di-sec-butyl-p-phenylenediamine, 160.0 g. (1.6 moles) triethylamine, 26.0 g. (0.2 mole) bis(chloromethyl) sulfide and 200 cc. toluene was stirred for 6 hrs. at 190° C. at 100–130 p.s.i.g. autogenous pressure. The reaction mixture was filtered at room temperature to remove 43.4 g. (79%) triethylamine hydrochloride and the filtrate was evaporated at pot temperatures up to 100° C. at 760 down to 5 mm. Hg pressure. The distillation residue was the crude product, 92.5 g. (94%), red oil having a sulfide odor. The structure of the product is:

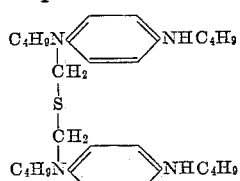

*Example 13.—N,N'-Di-Sec-Butyl-N,N'-Di[p-(Sec-Butylamino)Phenyl]Bis(2-Aminoethyl)Ether*

A mixture of 88.0 g. (0.4 mole) N,N'-di-sec-butyl-p-phenylenediamine, 80.8 g. (0.8 mole) triethylamine, 200 cc. toluene and 28.6 g. (0.2 mole) bis-(2-chloroethyl) ether was stirred for 13 hrs. in a 0.5 gal. autoclave at 180–190° C. at 70–93 p.s.i.g. autogenous pressure. After filtering off 45.0 (81.8%) triethylamine hydrochloride at room temperature the filtrate was evaporated at temperatures up to 120° C. at 760–5 mm. Hg pressure. The distillation residue was the crude product, 94.5 g. (92.6%), a red oil of structure:

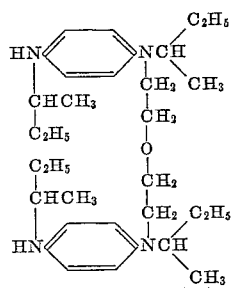

IV. Compounds of type:

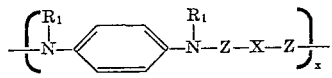

*Example 14*

A mixture of 88.0 g. (0.4 mole) N,N'-di-sec-butyl-p-phenylenediamine, 80.8 g. (0.8 mole) triethylamine, 57.2 g. (0.4 mole) bis-(β-chloroethyl)ether and 200 cc. toluene was stirred for 5.5 hrs. in a 0.5 gal. autoclave at 188–195° C. at 150–175 p.s.i.g. autogenous pressure. The reaction mixture was filtered at room temperature to isolate 94.0 g. (85.5%) triethylamine hydrochloride and the filtrate was evaporated at pot temperatures up to 110° C. at 760–5 mm. Hg pressure. The distillation residue was the crude product, 94.8 g. (81.5%), a red oil of structure:

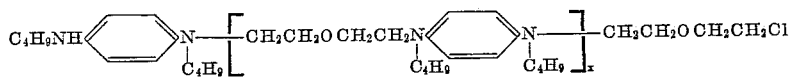

EVALUATION OF ANTIOZONANTS

ANTIOZONANT TESTING (A) *Ozone test.*—Two parts per hundred of the rubber of antiozonant are milled in the following base rubber compound:

| | Parts |
|---|---|
| SBR-1500 | 100 |
| HAF black | 50 |
| ZnO | 5 |
| Stearic acid | 3 |
| Petroleum residue softener | 10 |
| Sulfur | 2 |
| N-cyclohexyl-2-benzothiazolesulfenamide. | |

Sheets are prapered and press cured 60 minutes at 150° C. Specimens are stretched 20% and exposed at 37.8° C. to ozone at a concentration of 50 parts per one hundred million. The time is noted for the first crack to appear on either one of the four sides of the specimen. An "antiozonant factor" is obtained by comparing this time with the time necessary for the first crack to appear on a specimen containing no antiozonant. A control with no antiozonant is taken as 1.0 and a value higher than 1.0 for the "antiozonant factor" indicates antiozonant protection.

(B) *Outdoor exposure test.*—Samples of rubber stock made according to the above recipe were placed on the roof of a three story building and exposed to sunlight and naturally occurring ozone for two months. The "antiozonant factor" was determined in the same manner as for the ozone test above.

ANTIOXIDANT TESTING

One part per hundred parts of rubber of the compound to be tested is mixed on the mill with the following rubber compound:

| | Parts |
|---|---|
| Smoked sheet blend (Hevea) | 100 |
| CaCO₃ | 75 |
| ZnO | 10 |
| Stearic acid | 2 |
| Sulfur | 3 |
| Diphenylguanidine (DPG) | 1.5 |

Three samples of the milled product are then press cured for 15, 30, and 60 minutes respectively at 138° C. and tensile strength of all three cures measured before and after aging four days in an oxygen bomb held at 70° C. with the oxygen pressure at 300 p.s.i. The sum of the percent of retained tensile after aging for each sample is the antioxidant index.

A second series of the antioxidant index with a different accelerator is obtained in the same way, but press curing at 148° C. and seven-day bomb aging at 70° C. The rubber compound used follows:

| | Parts |
|---|---|
| Pale crepe (Hevea) | 100 |
| CaCO₃ | 50 |
| TiO₂ | 20 |
| ZnO | 10 |
| Stearic acid | 2 |
| Sulfur | 3 |
| Bis(2-mercaptobenzothiazolyl) disulfide (MBTS) | 1 |

The antioxidant indices are reported as the sum of the antioxidant index obtained for each series. The higher the index the better the antioxidant activity.

SCORCH TESTING

A base rubber compound of the following composition is prepared:

| | Parts |
|---|---|
| Pale crepe | 100 |
| Calcium carbonate | 10 |
| Zinc oxide | 50 |
| Titanium dioxide | 20 |
| Stearic acid | 2 |
| Spider sulfur | 3 |
| Bis(2-mercaptobenzothiazolyl) disulfide (MBTS) | 1 |

One part per hundred rubber of the antiozonant is added to the above rubber compound to obtain test rubber samples. The time in minutes is measured for a 5-unit Mooney viscosity increase for each of the samples at 262° F. The longer the time for the rise the less the scorching tendencies.

VOLATILITY TESTING

A known amount (between 2 and 3 grams) of each compound tested is placed in a Petri dish and the percent weight loss is determined after expose in a hot air circulating oven held at 121° C.

DISCOLORATION TESTS

One part per hundred rubber of each product tested is added to the following base rubber compound:

| | Parts |
|---|---|
| Pale crepe | 100 |
| Calcium carbonate | 10 |
| Zinc oxide | 50 |
| Titanium dioxide | 20 |
| Stearic acid | 2 |
| Spider sulfur | 3 |
| MBTS | 1 |

Sheets are press cured 30 minutes at 150° C. One-half of each 1 x 4 inch specimen is exposed to a sunlamp for 48 hours. The discoloration of the specimen is visually compared with the discoloration of the blank specimen.

The data obtained in the above tests are presented in the following tables. Table I lists the results of antioxidant and antiozonant tests on several representative compounds of this invention:

TABLE I
*Antioxidant and Antiozonant Properties*

| Compound of Example No. | Antioxidant Index | Antiozonant Index | |
|---|---|---|---|
| | | Ozone Test (Ratio to Control) | Outdoor Exposure (Ratio to Control) |
| Control-None | 162 | 1.0 | 1.0 |
| 2 | | 2.0 | 8.8 |
| 3 | 442 | 1.25 | 1.5 |
| 6 | | 30 | 58 |
| 9 | 369 | 1.25 | 2.2 |
| 12 | | 36 | 74 |
| 13 | | 22 | 58 |
| 14 | | 6 | 28 |

Table II which follows shows the improved volatility of the compounds of this invention over comparative prior art antiozonants:

TABLE II

| Compound | Example No. | Volatility, Percent Loss at 121° C. after | |
|---|---|---|---|
| | | 8 Hours | 24 Hours |
| N,N'-Bis[3-(5-methyl)heptyl]-N-methylmercaptomethyl-o-phenylenediamine | (1) | | 24.2 |
| N,N'-Bis[3-(5-methyl)heptyl]-N,N'-bismethylmercaptomethyl-p-phenylenediamine | (7) | | 20.3 |
| N,N'-Bis[3-(5-methyl)heptyl]-p-phenylenediamine | | | 30 |
| N,N'-Di-sec-butyl-N-methylmercaptomethyl-p-phenylenediamine | (4-A) | 62 | |
| N,N'-Di-sec-butyl-N,N'-di-methylmercaptomethyl-p-phenylenediamine | (10) | 51 | |
| N,N'-Di-sec-butyl-p-phenylenediamine | | 98 | |

Table III below compares prior art compounds with the compounds of this invention with respect to scorch and discoloration characteristics.

TABLE III

| Compound | Scorch Time for 5-Unit Rise | Color Rating After 48 Hour Exposure to U.V. Light |
|---|---|---|
| N,N'-Bis[3-(5-methyl) heptyl]-p-phenylenediamine | 35.7 | Very poor. |
| N,N'-Di-sec-butyl-p-phenylenediamine | 8.3 | Do. |
| Compound of Example 12 | 15.6 | Improved. |
| Compound of Example 13 | 23.2 | Do. |
| Compound of Example 14 | 20.0 | Do. |

It is evident from the data presented in the above Tables I, II, and III that the novel compounds not only have good antiozonant and antioxidant effects, but also that the associated properties of these novel antiozonants make them of significant value in elastomer processing. It will be understood that numerous variations and changes may be made from the specific description and examples set forth above without departing from the spirit and scope of this invention.

We claim:

1. Novel compounds having the structural formula

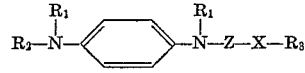

where $R_1$ is a member of the group of alkyl, alkenyl, and cycloalkyl radicals containing from one to twelve carbon atoms, $R_2$ is a member of the group of hydrogen, $R_1$ and —Z—X—$R_3$ radicals, $R_3$ is a member selected from the group of $R_1$ and

radicals, Z is an alkylene radical containing one to four carbon atoms and X is an atom selected from the group of oxygen and sulfur.

2. Novel compounds having the structure

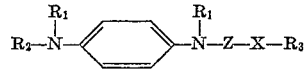

where $R_1$ is an alkyl radical containing from three to nine carbon atoms, $R_2$ is a member of the group of hydrogen, $R_1$, and —Z—X—$R_3$ radicals, $R_3$ is selected from the group of $R_1$ and

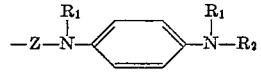

radicals, Z is an alkylene radical containing one to four carbon atoms, and X is an atom selected from the group of oxygen and sulfur.

3. Novel compounds having the structure

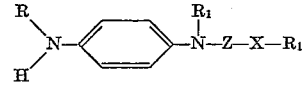

where $R_1$ is an alkyl radical containing from three to nine carbon atoms, Z is an alkylene radical containing one to four carbon atoms and X is an atom selected from the group of oxygen and sulfur.

4. N,N'-bis[3-(5-methyl) hepty]-N-methylmercaptomethyl-p-phenylenediamine.

5. N,N'-di-sec-butyl - N - (2-methylmercapto)-ethyl-p-phenylenediamine.

6. N,N'-di-sec-butyl-N-methylmercaptomethyl-p-phenylenediamine.

7. Compounds having the structure

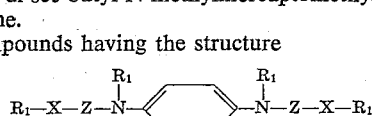

where $R_1$, Z and X are defined in claim 2.

8. N,N'- bis[3-(5-methyl) heptyl]-N,N.-bis(methylmercaptomethyl)-p-phenylenediamine.

9. N,N'-di-sec-butyl-N,N'-bis(methylmercaptomethyl)-p-phenylenediamine.

10. Compounds having the structure

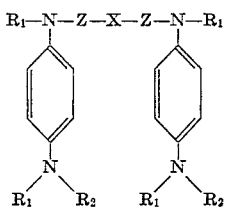

where $R_1$ is an alkyl group containing three to nine carbon atoms, $R_2$ is a member selected from the group of hydrogen and $R_1$ radicals, Z is an alkylene group containing one to four carbon atoms and X is an atom selected from the group of oxygen and sulfur.

11. N,N' - di - sec - butyl-N,N'-di[p-(sec-butylamino) phenyl]-di-(aminomethyl) sulfide.

12. N,N' - di - sec - butyl-N,N'-di[p-(sec-butylamino) phenyl]-bis (2-aminoethyl) ether.

13. Elastomeric materials containing from about 0.5% to 10% by weight of the elastomer of the compounds of claim 1.

14. Elastomeric materials containing from about 0.75 to about 3% by weight of the elastomer of the compounds of claim 2.

15. Elastomeric materials as in claim 14 where the elastomer is natural rubber.

16. Elastomeric materials as in claim 14 where the elastomer is a butadiene polymer rubber.

17. Elastomeric materials as in claim 14 where the elastomer is a styrene-butadiene polymer rubber.

18. The process of protecting elastomers against the adverse effects of oxygen and ozone which comprises incorporating in said elastomer from about 0.75% to about 3% by weight of the elastomer of a compound of claim 2.

19. The process of preparing compounds as defined in claim 2 which comprises reacting in an inert solvent and in the presence of an acid acceptor a haloether with a p-phenylenediamine of structure

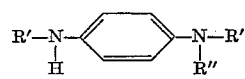

where R' is an alkyl radical containing from three to nine carbon atoms and R'' is a member of the group of hydrogen and R' radicals, said haloether reagent being selected from the group of haloalkyl ethers, haloalkyl thioethers, bis(haloalkyl) ethers and bis(haloalkyl) thioethers where the halogen atom is a member of the group of chlorine, bromine and iodine and said ether reagent containing in its alkylene radical from one to four carbon atoms.

No references cited.

UNITED STATES PATENT OFFICE
CERTIFICATE OF CORRECTION

Patent No. 3,035,014　　　　　　　　　　　　　　May 15, 1962

Ivan C. Popoff et al.

It is hereby certified that error appears in the above numbered patent requiring correction and that the said Letters Patent should read as corrected below.

Column 1, line 29, for "Fore" read -- For --; column 2, lines 12 to 19, the left-hand portion of the formula should appear as shown below instead of as in the patent:

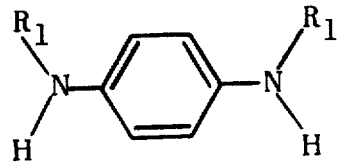

same column 2, line 61, for "—N—" read -- —N'— --; column 9, line 74, for "prapered" read -- prepared --; column 11, line 4, for "expose" read -- exposure --; column 12, line 62, for "-(5-methyl)heptyl-" read -- -(5-methyl)heptyl]- --; line 74, for "—N,N.—" read -- —N,N'— --.

Signed and sealed this 4th day of September 1962.

(SEAL)
Attest:

ERNEST W. SWIDER

Attesting Officer

DAVID L. LADD

Commissioner of Patents